United States Patent [19]
Iida et al.

[11] Patent Number: 5,702,792
[45] Date of Patent: Dec. 30, 1997

[54] OPTICAL RECORDING MEDIUM

[75] Inventors: Tetsuya Iida; Satoshi Jinno; Takanobu Higuchi, all of Tsurugashima, Japan

[73] Assignee: Pioneer Electronic Corporation, Tokyo, Japan

[21] Appl. No.: 675,317

[22] Filed: Jul. 1, 1996

[30]    Foreign Application Priority Data

Jul. 14, 1995  [JP]  Japan .................................. 7-201322

[51] Int. Cl.$^6$ ............................................. B32B 3/00
[52] U.S. Cl. .......................... 428/64.1; 428/644; 428/648; 428/447; 428/448; 428/913; 430/495.1; 430/945; 369/275.1; 369/283; 369/288
[58] Field of Search ................... 428/64.1, 64.4, 428/64.8, 446, 447, 448, 913; 430/270.11, 495.1, 945; 369/275.1, 283, 288

[56]         References Cited

U.S. PATENT DOCUMENTS

5,024,917  6/1991  Mihara et al. .......................... 430/271
5,242,731  9/1993  Shimizu et al. ......................... 428/64

*Primary Examiner*—Elizabeth Evans
*Attorney, Agent, or Firm*—Fish & Richardson P.C.

[57]            ABSTRACT

An optical recording medium of a multi-layer type comprises; a single or plural spacer layers each carrying pits and/or grooves; a single or plural reflective layers layered on the spacer layers; and a silane coupling treatment layer formed between the reflective layer and the spacer layer adjacent to each other.

2 Claims, 8 Drawing Sheets

OPTICAL RECORDING MEDIUM

BACKGROUND OF THE INVENTION

1. Field of the Invention

The present invention relates to an optical disc, and particularly to a read only memory type optical disc in which pits and/or grooves carrying information are formed on a plurality of layers.

2. Description of the Related Art

Figure 7:
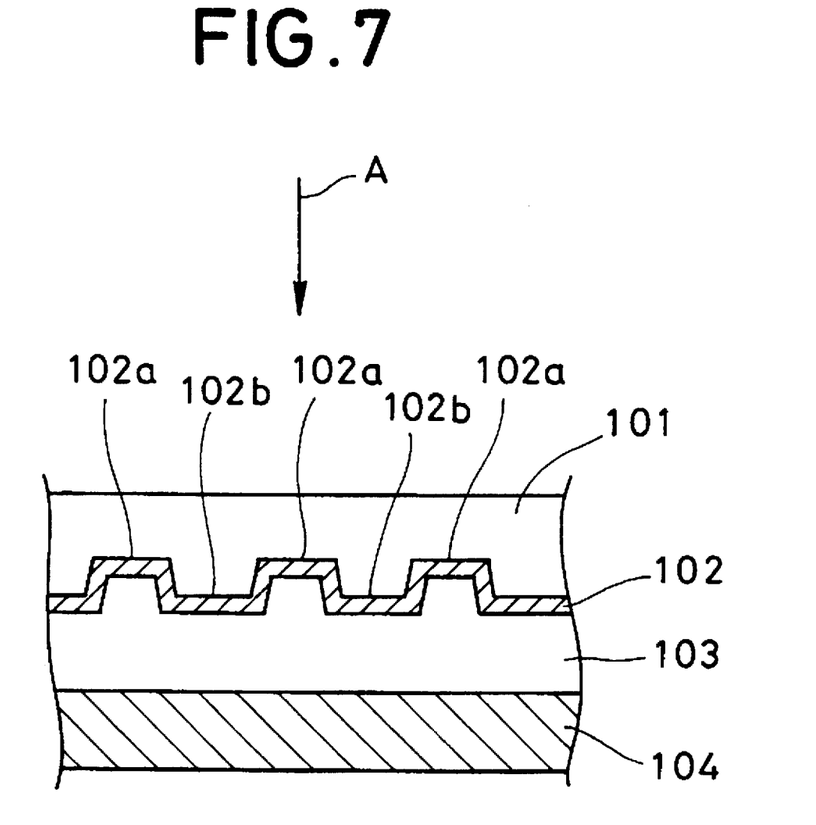
FIG. 7 is a schematic cross sectional view showing a portion with pits or grooves of CD in the prior art.

Compact disc (referred as a "CD" hereinafter) shown in FIG. 7 is known as a read only memory type optical disc in the prior art.

FIG. 7 shows a schematic cross sectional view of a portion of CD in which pits and/or grooves are formed.

In this figure, numeral 101 denotes a transparent substrate. The transparent substrate is formed by an injection molding machine in which a stamper for CD is set to the metal die, so that a thermoplastic resin such as polycarbonate is subjected to an injection molding or injection compression molding so that inverse pits carried on the stamper are transferred to the transparent substrate.

Numeral 102 denotes a reflective layer of metal such as Aluminum which is formed by a vacuum deposition or sputtering method on the transparent substrate 101 as a thin metallic film. The transparent substrate 101 is sealingly covered with the reflective layer so as to carry pits 102a or grooves 102b for the CD information.

Numeral 103 denotes a protective layer of a UV-cured acrylic resin which is formed at a uniform thickness on the reflective layer 102 by a spin-coating method and a UV irradiation to prevent the deterioration for damage of the reflective layer 102.

Numeral 104 denotes a label for CD made of a synthetic resin film which is formed on the protective layer 103 by a labeling such as a screen printing method. In this way, the pits and/or grooves are formed for CD information.

When the recorded information is read out from the rotating CD in such a manner that the optical pickup (not shown) irradiates a laser beam to the pits 102a or grooves 102b in the transparent substrate 101 of the CD (arrow A shown in FIG. 7) and then reads the reflected light thereof to reproduce the information.

On the other hand, it is recently demanded that the pits or grooves of the optical disc are formed at a much higher density as the higher density of information is required in the recording medium market. Thus, there is an attempt to form the pits or grooves in the optical disc of the multi-layer type structure.

Such a multi-layer type optical disc ordinarily comprises a plurality of pair layers of a spacer layer and an intermediate reflective layer between the reflective layer 102 and the transparent substrate 101. The intermediate reflective layer and the spacer layer are alternatively layered one another so that pits or grooves are formed on each of plural layers of the optical disc.

Figure 8A:
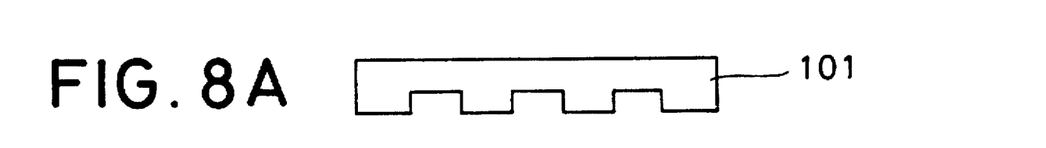
FIGS. 8A to 8E are schematic cross sectional views showing substrates for the two-layer type optical disc in a conventional manufacturing method respectively.
Figure 8B:
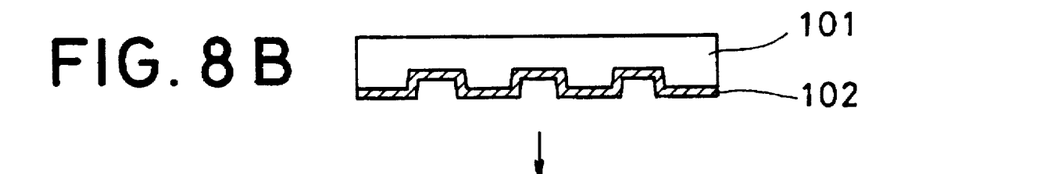
Figure 8C:
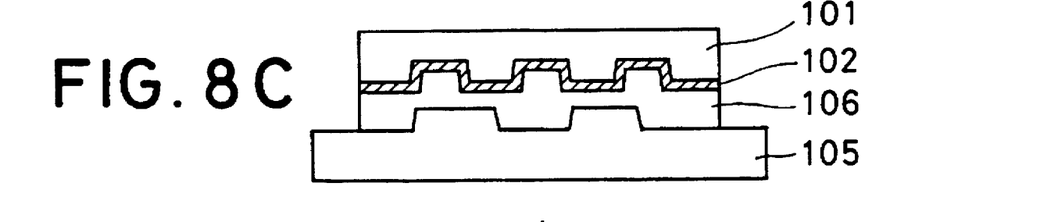
Figure 8D:
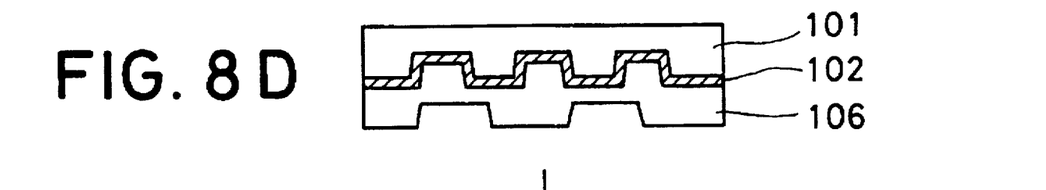
Figure 8E:
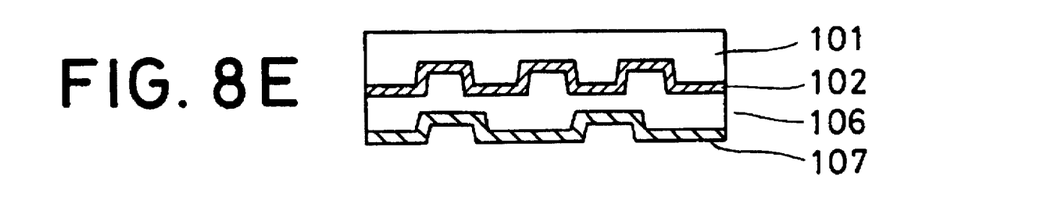

The optical disc of the multi-layer type is manufactured as shown in FIGS. 8A to 8E. In the step of FIG. 8A, a transparent substrate 101 having first pits or grooves is formed. After that, in the step of FIG. 8B, a first intermediate reflective layer 102 is formed on the pits or grooves of the substrate. In the step of FIG. 8C, a fluid UV-cured acrylic resin is uniformly provided on a stamper 105a which carries 65 transferred second pits or grooves different from the first pits or grooves of the first intermediate reflective layer 102. After that, the substrate 101 is put on the fluid UV-cured acrylic resin in such a manner that the first intermediate reflective layer 102 is maintained at a predetermined interval with respect to the surface of the stamper and then UV rays are irradiated through the transparent substrate 101 to the fluid UV-cured acrylic resin so as to cure the resin as a first spacer layer 106. Next, in the step of FIG. 8D, the transparent substrate 101 together with the first spacer layer 106 is peeled off the stamper. In the step of FIG. 8E, a reflective layer 107 of metallic thin film with a predetermined reflectance is formed on the first spacer layer 106 through the vacuum deposition or the sputtering method.

Next, a protective layer is formed on the reflective layer 107 and then a label is formed on the protective layer. In this way, the optical disc of two-layer type having pits or grooves is manufactured.

In the case of manufacture of an optical disc of three-layer or multi layer type a set of the steps of FIGS. 8C to 8E is successively repeated after the step of FIG. 8E, the other spacer layer and the reflective layer are formed by using the other stampers each carrying transferred second pits or grooves different from the pits or grooves of the first and second intermediate reflective layers 102. After the formation of the last reflective layer, a protective layer is formed on the last reflective layer and then a label is formed on the protective layer. In this way, the optical disc of multi-layer type is manufactured.

As mentioned above, the number of peeling steps of the stamper is in proportional to the number of the reflective layers in the manufacturing process for providing the multi-layer type optical disc having pits or grooves. In this prior art, the moisture may remain in the interface between the reflective layer and the spacer layer after the formation of the reflective layer or the spacer layer since the moisture exists in the materials thereof as well as in the surrounding humidity atmosphere. Thus the remaining moisture in the interface causes to weaken the adhesion between the spacer layer and the reflective layer, so that the spacer layer remains on the stamper rather than the reflective layer even when the stamper is peeled from the spacer layer of the substrate. As a result, there is a problem that the optical disc is not easily manufactured to restrict the yield rate of products.

In addition, there is also a probability that the spacer layer and the reflective layer tend to peel partially from one another in the resultant optical discs due to the deterioration caused by the outer environment and the time elapsing. The partial separation of the spacer layer and the reflective layer causes the disorder of the optical path of the light beam in the optical pickup device when the incident light beam is reflected from reflective layer in the optical disc. As a result, there is also a problem that, when reproducing data from the optical disc, pits are not correctly read by the optical pickup device.

SUMMARY OF THE INVENTION

Therefore, the present invention has been made to solve such a problem in view of the forgoing status. An object of the invention is to provide a read only memory type optical disc of a multi-layer type having pits or grooves which has a durability against the outer environment and the time elapsing. It is another object of the present invention to provide a method for manufacturing stably a multi-layer type optical disc.

In accordance with a first aspect, the present invention features that an optical recording medium such as an optical disc of a multi-layer type comprises a single or plural spacer layers each carrying pits and/or grooves; a single or plural reflective layers layered on the spacer layers; and a silane coupling treatment layer formed between the reflective layer and the spacer layer adjacent to each other.

In accordance with a second aspect, the present invention features that the silane coupling treatment layer is formed in such a manner that the reflective layer is made of a material containing —OH group, and then the reflective layer is provided with a silane coupling treatment.

In accordance with a third aspect, the present invention features that the silane coupling treatment layer is formed in such a manner that the reflective layer is made of an oxide thin film or more, and then the reflective layer is provided with a silane coupling treatment.

An advantage of the present invention in the first aspect is that the silane coupling treatment layer enhances the adhesion between the spacer layer and the reflective layer during the manufacture of a read only memory type optical disc in which pits and/or grooves carrying information are formed on a plurality of layers, because the silane coupling treatment layer formed between the reflective layer and the spacer layer adjacent to each other. Another advantage of the present invention in the second aspect is that the silane coupling treatment layer enhancing the adhesion between the spacer layer and the reflective layer is easily and stably formed during the manufacture of a read only memory type optical disc in which pits and/or grooves carrying information are formed on a plurality of layers, because the reflective layer made of the material containing —OH group is provided with the silane coupling treatment.

Still, another advantage of the present invention in the third aspect is that the silane coupling treatment layer enhancing the adhesion between the spacer layer and the reflective layer is also easily and stably formed during the manufacture of a read only memory type optical disc in which pits and/or grooves carrying information are formed on a plurality of layers, because the reflective layer made of an oxide thin film or more is provide with the silane coupling treatment.

Additional features and advantages of the present invention are described in, and will be apparent from, the detailed description of the presently preferred embodiments.

DETAILED DESCRIPTION OF THE PREFERRED EMBODIMENTS

Figure 1A:
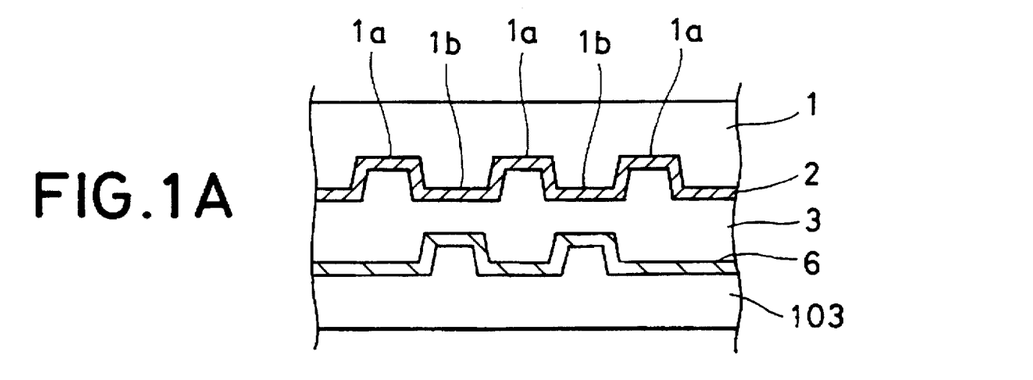
FIGS. 1A and 1B are schematic cross sectional views showing multi-layer type optical discs of three-layer and two-layer types respectively in a first embodiment according to the present invention.
Figure 1B:
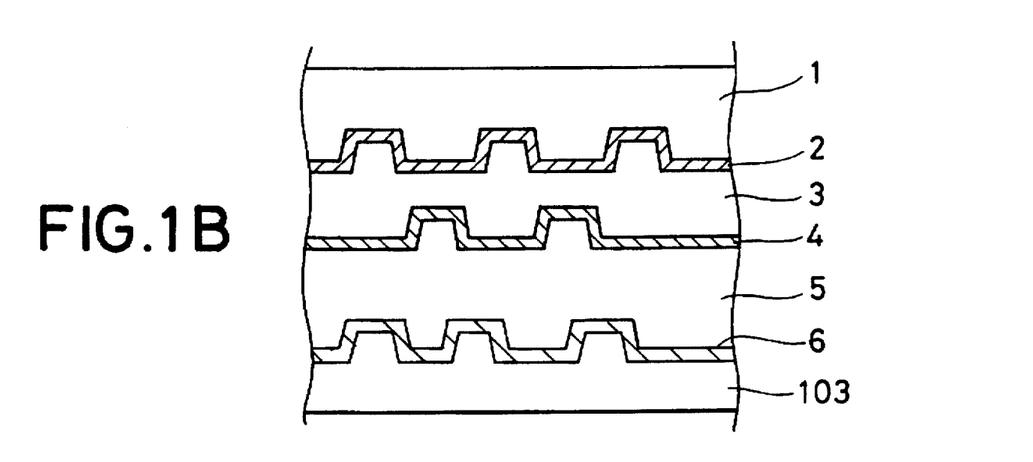

Next, the embodiments according to the present invention will be described in more detail with reference to the accompanying drawings. FIG. 1A shows partially enlarged pits or grooves formed in a two-layer type optical disc of a first embodiment, and then FIG. 1B shows a three-layer type optical disc.

In both the figures, numeral 1 denotes a transparent substrate on which the pits or grooves are formed. The transparent substrate is formed by an injection molding machine in which a stamper having the inverse pits or grooves is set to the metal die of the machine, so that a thermoplastic resin such as polycarbonate, acrylic resin or the like is subjected to an injection molding or injection compression molding so that the inverse pits or grooves carried on the stamper are transferred the transparent substrate.

Numeral 2 denotes a first intermediate reflective layer of a metallic thin film or a dielectric layer. The dielectric layer is made of an organic dye or an inorganic dielectric layer such as a metallic thin film, or phthalocyanine derivative, naphthalocyanine derivative, spiropyran derivative, spirooxazine derivative, diarylethene derivative. The dielectric layer is constructed with a single layer or plural layers at a predetermined thickness by a vacuum deposition or sputtering method on the transparent substrate 1 so as to have a predetermined reflectance and transmittance. The transparent substrate 1 is sealingly covered with the first intermediate reflective layer so as to carry pits 1a or grooves 1b for a first layer. In addition, an oxidation film is formed on the surface of the first intermediate reflective layer 2 formed the transparent substrate 1 by an oxidation treatment.

Numeral 3 denotes a first spacer layer of a UV-cured acrylic resin. The first spacer layer is formed at a uniform thickness on the first intermediate reflective layer 2 by a spin-coating method in such a manner that, after the fluid UV-cured acrylic resin is provided on the oxidation film of the first intermediate reflective layer 2, the substrate 1 with the layer 2 is maintained at a predetermined interval with respect to the surface of a second stamper having inverse pits or grooves, and then UV rays are irradiated through the transparent substrate 1 to the fluid UV-cured acrylic resin so as to cure the resin as the first spacer layer 3. It is important that a silane coupling treatment is previously provided on the oxidation film of the first intermediate reflective layer 2 before the formation of the first spacer layer 3.

Numeral 4 denotes a second intermediate reflective layer. This layer is formed on the first spacer layer 3 by the similar manner of the first intermediate reflective layer 2. The dielectric or metallic layer is made of the same material as the first intermediate reflective layer 2 so as to have a predetermined reflectance and transmittance. The first spacer layer 3 is thus sealingly covered with the second intermediate reflective layer 4 so as to carry pits or grooves for a second layer in the optical disc. In addition, an oxidation film is also formed on the surface of the second intermediate reflective layer 4 by the oxidation treatment.

Numeral 5 denotes a second spacer layer of a UV-cured acrylic resin which is formed on the second intermediate reflective layer 4 by the similar manner of the first spacer layer 3 at a predetermined thickness. It is also important that the silane coupling treatment is previously provided on the oxidation film of the second intermediate reflective layer 4 before the formation of the second spacer layer 5. The silane coupling treatment is described later.

Numeral 6 denotes an ordinary reflective layer of metallic thin film such as Aluminum with a predetermined reflectance which is formed on the first spacer layer 3 as shown in FIG. 1A as well as on the second spacer layer 5 as shown in FIG. 1B through the vacuum deposition or the sputtering method. In FIG. 1B, the reflective layer 6 carries pits or grooves for a third layer in the optical disc.

Numeral 103 denotes a protective layer of a UV-cured acrylic resin which is formed at a uniform thickness on the reflective layer 6 by a spin-coating method and a UV irradiation to prevent the deterioration for damage of the reflective layer.

Figure 2:
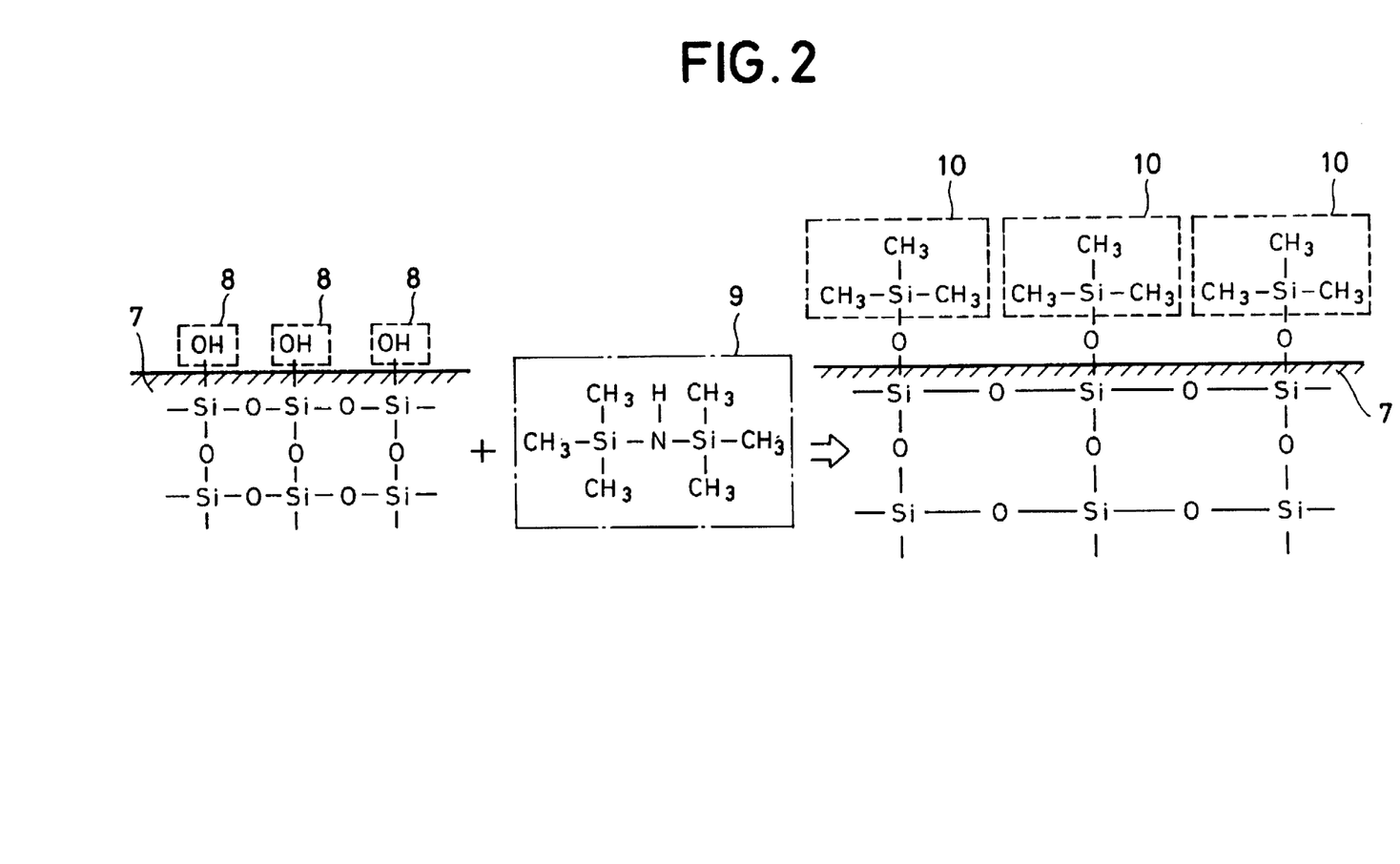
FIG. 2 is a diagram showing a graphical reaction in which a hydrophilic surface of a glass substrate is changed to hydrophobic by a silane coupling treatment of an organic silicon compound according to the present invention.

The silane coupling treatment is a hydrophobic treatment which is used for making a moisture-repellent surface of a glass substrate 7 before a patterning of an electric circuit or a silk-screen-printing of characters on a print-circuit-board in order that copper layers or ink materials easily adhesive on the glass substrate 7, for example, as shown in FIG. 2. The silane coupling treatment is conducted in such manner that the glass substrate 7 is put in a closed chamber filled with hexamethyldisilazane 9 belonging to organic silicon compounds in the form of vapor. As show in FIG. 2, hydrogen atoms (H) of the —OH group terminals 8 of the surface of the glass substrate 7 are substituted with —Si(CH$_3$)$_3$ groups 10. In this way, the silane coupling treatment is capable of changing a hydrophilic surface with —OH groups or oxides into a hydrophobic surface with organic groups. In other words, a silane coupling treatment layer is formed between the reflective layer and the spacer layer adjacent to each other.

In the multi-layer type optical disc according to the present invention as shown in FIGS. 1A and 1B, organic silicon compounds of coupling agent usable for the silane coupling treatment are listed, for examples, is as follows:

(1) vinyltriethoxysilane, (2) γ-glycidoxypropyltrimethoxysilane, (3) γ-aminopropyltriethoxysilane, (4) γ-methacryloxypropyltrimethoxysilane, (5) N-(β-aminoethyl)-γ-aminopropyltrimethoxysilane, (6) hexamethyldisilazane, and (7) tetramethyldisilazane.

When the surfaces of the reflective layer 2, the first reflective layer 4 and the second reflective layer 6 are subjected to the silane coupling treatment, hydrogen atoms (H) of the —OH group terminals of each oxidation film formed on the surface of the reflective layer are substituted with —Si(CH$_3$)$_3$ groups, so that the surface of the reflective layer becomes hydrophobic. Therefore, the interface adhesion is improved because no moisture remains in the interfaces between the reflective layer 2 and the first spacer layer 3, as well as between the first reflective layer 4 and the second spacer layer 5.

Any one of (1) vinyltriethoxysilane, (2) γ-glycidoxypropyltrimethoxysilane, (3) γ-aminopropyltriethoxysilane, (4) γ-methacryloxypropyltrimethoxysilane and (5) N-(β-aminoethyl)-γ-aminopropyltrimethoxysilane has a low vapor pressure. Therefore, this coupling agent can be used in such a manner that the surface of the reflective layer is coated or provided with the silane couplings through a piece of cloth, paper towel soaking with a from 5 to 10% coupling agent solution of methyl alcohol or ethyl alcohol. In addition, the surface of the reflective layer is coated with such a solution through the spin-coating method.

Since the silane couplings of (6) hexamethyldisilazane and (7) tetramethyldisilazane have comparatively high vapor pressures, the silane coupling treatment may be conducted in such manner that the glass substrate to be treated is put and maintained in a closed chamber filled with the vapor of such a silane coupling, so that the silane derivative is provided to the surface of the substrate.

Next, the second embodiment according to the present invention will be described with reference to FIG. 3 and FIG. 4.

Figure 3:
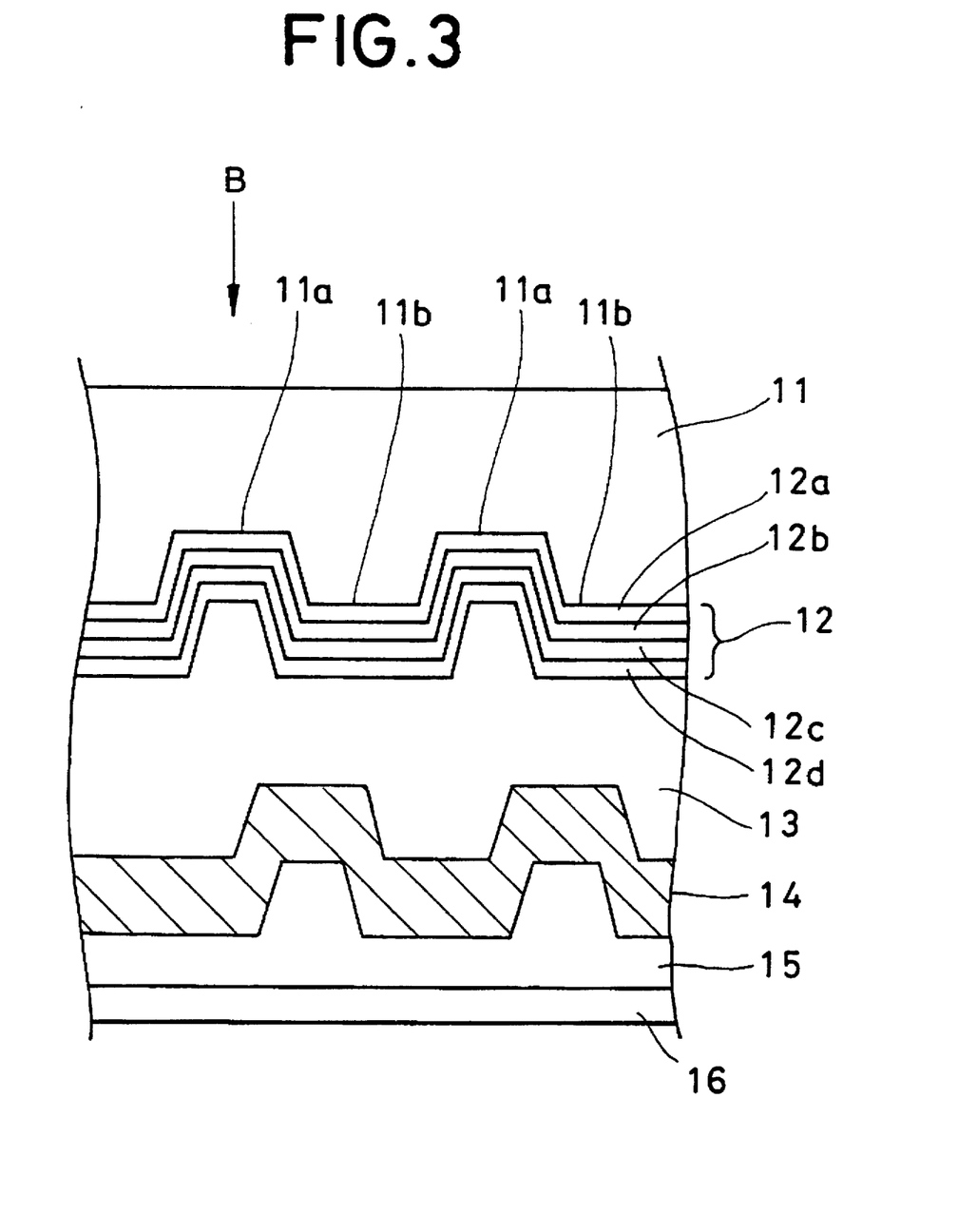
FIG. 3 is a schematic cross sectional view showing a two-layer type optical disc of a second embodiment according to the present invention.

FIG. 3 is a schematic cross sectional view showing a two-layer type optical disc of a second embodiment according to the present invention.

In FIG. 3, numeral 11 denotes a transparent substrate made of polycarbonate with refractive index of 1.569 on which the pits or grooves are formed. The transparent substrate is formed at approximately 1 mm thickness by an injection molding machine so that the pits or grooves carried on the stamper are transferred to the transparent substrate.

Numeral 12 denotes a first intermediate reflective layer consisting of four layers, or a first dielectric layer 12a made of SiO$_2$ of refractive index 1.5 with a 1300 angstroms thickness, a second dielectric layer 12b made of ZnSSiO$_2$ of refractive index 2.11 with a 924 angstroms, a third dielectric layer 12c made of SiO$_2$ of refractive index 1.5 with a 1300 angstroms and a fourth dielectric layer 12d made of ZnSSiO$_2$ refractive index 2.11 with a 924 angstroms which are layered in sequence. The first intermediate reflective layer so as to carry pits 1a or grooves 1b for a first layer. The transparent substrate 11 is sealingly covered with the first intermediate reflective layer so as to carry pits 11a or grooves 11b for a first layer in the optical disc.

On the surface of the dielectric layer 12d in the first intermediate reflective layer 12, the silane coupling layer above mentioned is formed though the silane coupling treatment, so that the surface of the first intermediate reflective layer 12 is hydrophobic.

Numeral 13 denotes a first spacer layer of a UV-cured acrylic resin of refractive index 1.569. The first spacer layer is formed at approximately tens μm thickness on the first intermediate reflective layer 12 by a spin-coating method in such a manner that, after the fluid UV-cured acrylic resin is provided on the fourth dielectric layer 12d made of ZnSSiO$_2$ of the first intermediate reflective layer 12, the substrate 11 with the layer 12 is maintained at the predetermined interval with respect to the surface of a second stamper having inverse pits or grooves, and then UV rays are irradiated through the transparent substrate 1 to the fluid UV-cured acrylic resin so as to cure the resin as the first spacer layer 13. Since the first intermediate reflective layer 12 is hydrophobic, the adhesion between the first spacer layer 13 and the first intermediate reflective layer 12 is enhanced.

Numeral 14 denotes a second intermediate reflective layer of Aluminum. This layer is formed at a 1000 angstroms thickness on the first spacer layer 13 by the vacuum deposition or the sputtering method.

Numeral 15 denotes a protective layer of a UV-cured acrylic resin which is formed at approximately 10 μm thickness on the reflective layer by a spin-coating method and a UV irradiation to prevent the deterioration for damage of the reflective layer.

Numeral 16 denotes a label of paper and/or an ink film which is formed on the protective layer 15 by a screen printing method. In this way, a two-layer type optical disc having pits and/or grooves is formed.

Figure 4:
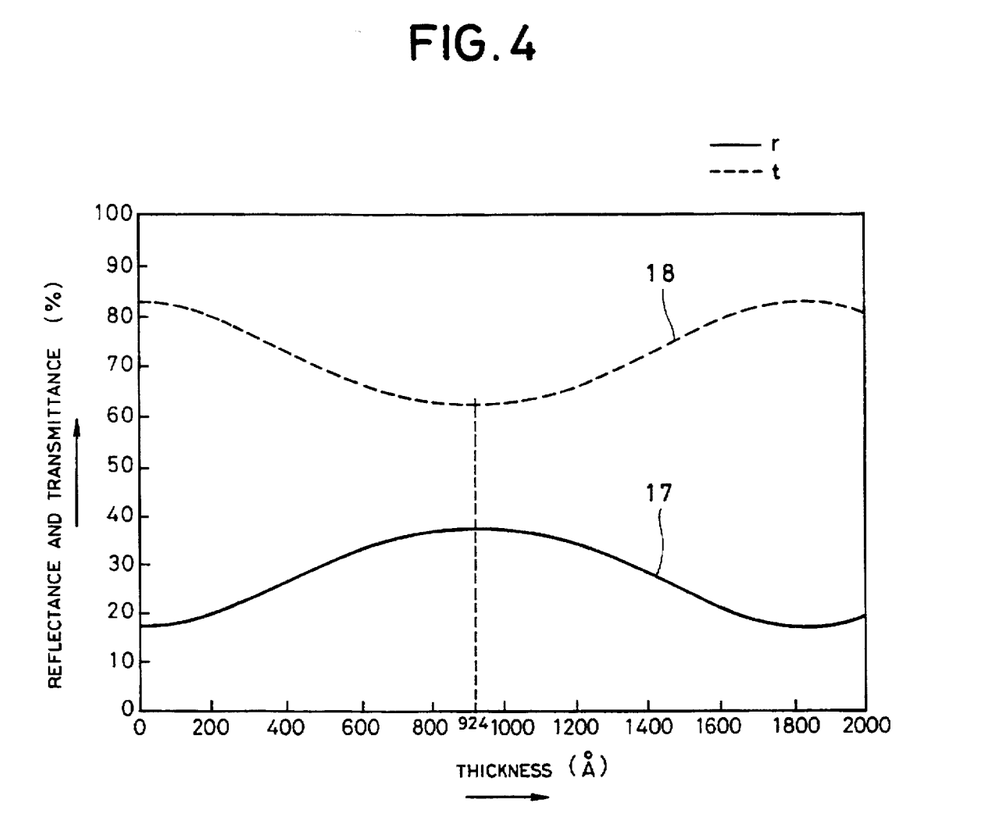
FIG. 4 is a graph showing variations of reflectance and transmittance of the first intermediate reflective layer in the two-layer type optical disc according to the present invention.

FIG. 4 is a graph showing variations of reflectance and transmittance of the fourth dielectric layer 12d in the first intermediate reflective layer 12 in the two-layer type optical disc structure shown in FIG. 3.

In FIG. 4, the vertical axis represents the reflectance and transmittance of the dielectric layer 12d and the horizontal axis represents the thickness thereof. Two curved lines of the reflectance 17 and transmittance 18 in the graph of FIG. 4 are obtained under the conditions that the reflected light and transmitted light are detected while the laser beam of wavelength 780 nm is irradiated to the optical disc in the direction B shown in FIG. 3 respectively.

As seen from FIG. 4, at 924 angstroms thickness of the dielectric layer 12d, the reflectance 17 of the first intermediate reflective layer 12 is approximately 37% and transmittance 18 thereof is about 63%.

Therefore, when the optical pickup focuses a convergence laser beam onto pits of the first intermediate reflective layer 12 in the two-layer type optical disc shown in FIG. 3, then the photodetector of the optical pickup receives the reflected light from the first layer at approximately 37% reflectance under the conditions that the convergence laser beam of wavelength 780 nm is irradiated to the optical disc in the direction B shown in FIG. 3.

Under the same conditions above, when the optical pickup focuses a convergence laser beam onto pits of the reflective layer 14 in the second layer, the laser beam passes through the first intermediate reflective layer 12 at 63% transmittance to be reflected by the reflective layer 14 at a little loss. The reflected light passes through the first intermediate reflective layer 12 at 63% transmittance and then detected by the photodetector of the optical pickup. Therefore the reflectance of the reflected light from the second layer 63%×63% detected by the photodetector becomes nearly equal to that of 37% reflectance from the first layer.

As mentioned above, it is possible that only one optical pickup focuses a convergence laser beam onto pits in one of the two layers of the optical disc shown in FIG. 3 in an alternative way without using the plural optical pickups for the plural layer each carrying pits. Therefore, this embodiment achieves a simplicity of a reading device for the two-layer type optical disc.

Figure 5:
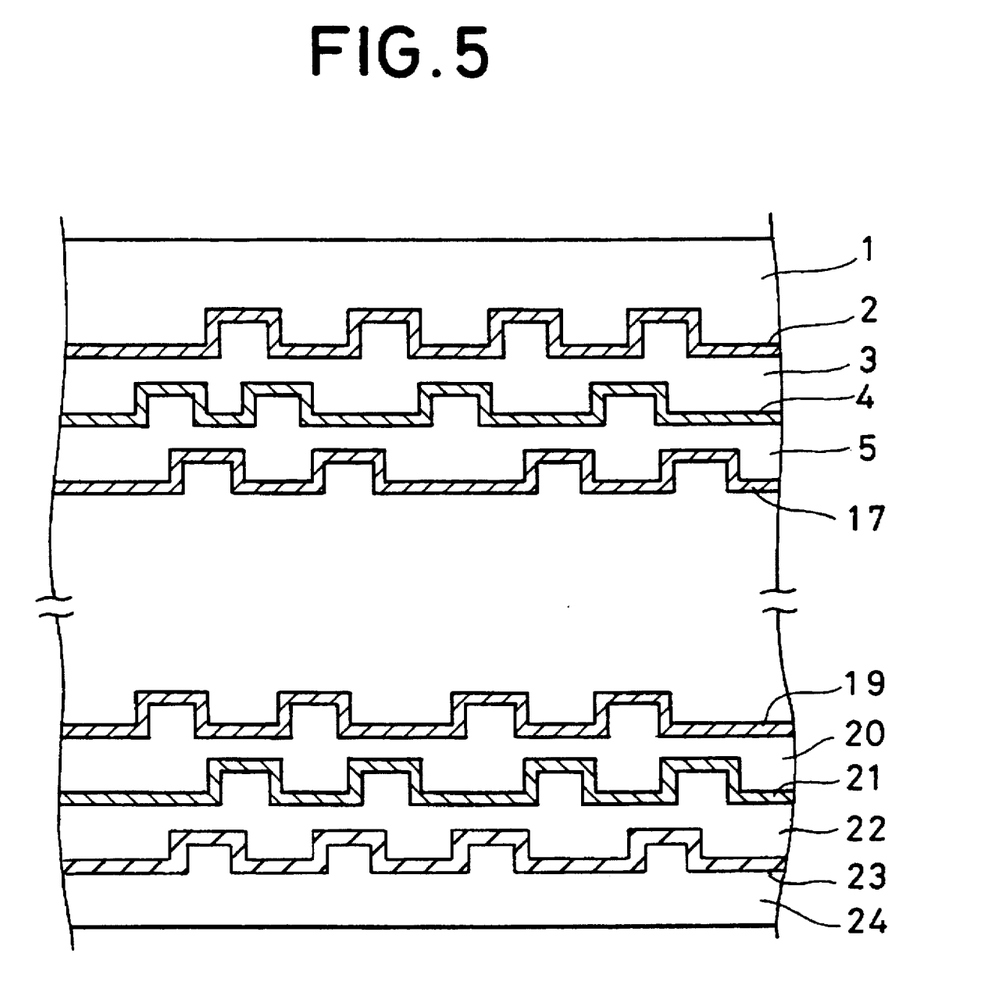
FIG. 5 is a schematic cross sectional view of a multi-layer type optical disc having Nth layers of another embodiment according to the present invention.

In addition to the above embodiment of the present invention including the optical discs of the two layer type and the three-layer type having pits or grooves, another embodiments may employ a four-layer type optical disc structure as shown in FIG. 5.

In addition to the above embodiment of the present invention including an ordinary reflective layer made of Aluminum, Aluminum-titanium alloy or metal such as Gold, Silver, Nickel, Chromium, Copper and the like may be used for the reflective layer in the optical disc.

In addition to the above embodiment that each intermediate reflective layer of the multi-layer type optical disc is formed of dielectric of oxide, another embodiment may employ materials with a predetermined reflectance and transmittance including —OH groups.

Figure 6:
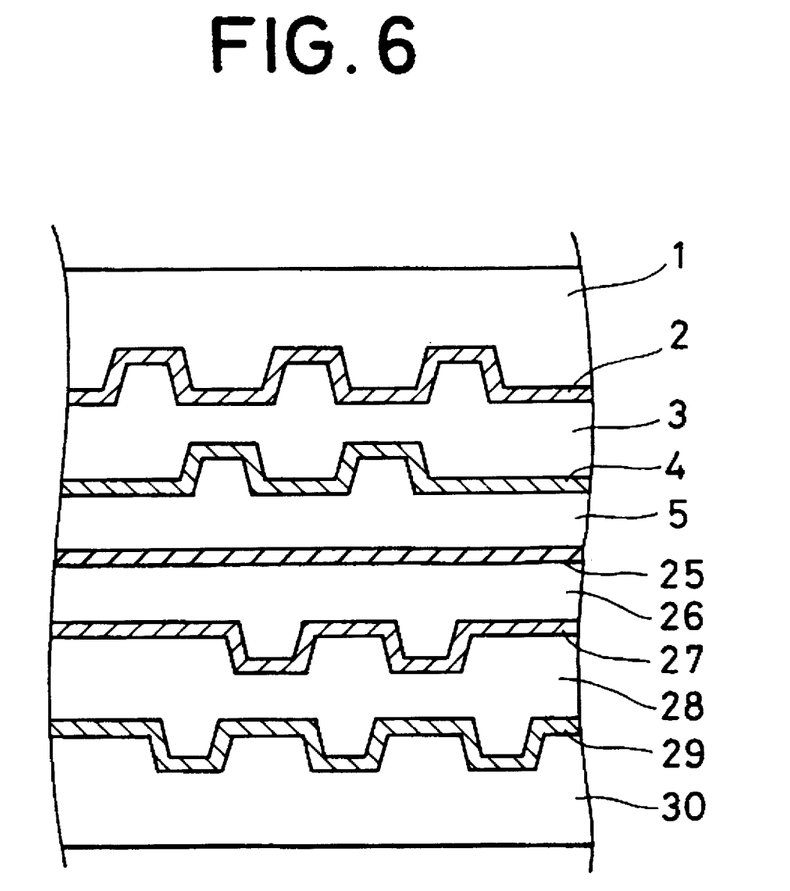
FIG. 6 is a schematic cross sectional view of a double sided multi-layer type optical disc of another embodiment according to the present invention.

Further, the intermediate reflective layers and the spacer layers in the multi-layer type optical disc may be formed of suitable materials different in the reflectance and transmittance from each other. Moreover, such materials may be selected to meet of the desired reflectance of the optical disc. In addition to the above embodiment of the present invention including the one-sided optical disc of the multi-layer type in that the optical pickup irradiate the light beam onto pits or grooves in the one-side of the optical disc in which the reflected light from only one-side thereof is read, another embodiment may employ a double-sided multi-layer type optical disc as shown in FIG. 6 comprising two multi-layer type optical discs pasted one another in which the reflected lights from both sides thereof are read.

According to the present invention, an advantage may be achieved by the first aspect is that the silane coupling treatment layer enhances the adhesion between the spacer layer and the reflective layer during the manufacture of a read only memory type optical disc in which pits and/or grooves carrying information are formed on a plurality of layers, because the silane coupling treatment layer formed between the reflective layer and the spacer layer adjacent to each other.

Another advantage of the present invention in the second aspect is that the silane coupling treatment layer enhancing the adhesion between the spacer layer and the reflective layer is easily and stably formed during the manufacture of a read only memory type optical disc in which pits and/or grooves carrying information are formed on a plurality of layers, because the reflective layer made of the material containing —OH group is provided with the silane coupling treatment.

Still, another advantage of the present invention in the third aspect is that the silane coupling treatment layer enhancing the adhesion between the spacer layer and the reflective layer is also easily and stably formed during the manufacture of a read only memory type optical disc in which pits and/or grooves carrying information are formed on a plurality of layers, because the reflective layer made of an oxide thin film or more is provide with the silane coupling treatment.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. An optical recording medium of a multi-layer type comprising:

a substrate a single or plural spacer layers each carrying pits and/or grooves;

a single or plural reflective layers layered on the spacer layers; and wherein said reflective layer is made of a material including —OH groups and a surface of said reflecting layer furthest from said substrate contacting with said spacer layer is provided with a silane coupling treatment.

2. An optical recording medium of a multi-layer type comprising:

a substrate a single or plural spacer layers each carrying pits and/or grooves;

a single or plural reflective layers layered on the spacer layers; and wherein said reflective layer is made of one or more oxide thin films and a surface of said reflecting layer furthest from said substrate contacting with said spacer layer is provided with a silane coupling treatment.

* * * * *